(12) United States Patent
Hashimoto

(10) Patent No.: US 12,404,388 B2
(45) Date of Patent: Sep. 2, 2025

(54) RESIN COMPOSITION

(71) Applicant: THREEBOND CO., LTD., Hachioji (JP)

(72) Inventor: Takahiro Hashimoto, Hachioji (JP)

(73) Assignee: THREEBOND CO., LTD., Hachioji (JP)

( * ) Notice: Subject to any disclaimer, the term of this patent is extended or adjusted under 35 U.S.C. 154(b) by 634 days.

(21) Appl. No.: 17/770,503

(22) PCT Filed: Oct. 12, 2020

(86) PCT No.: PCT/JP2020/038515
§ 371 (c)(1),
(2) Date: Apr. 20, 2022

(87) PCT Pub. No.: WO2021/085104
PCT Pub. Date: May 6, 2021

(65) Prior Publication Data
US 2022/0372249 A1 Nov. 24, 2022

(30) Foreign Application Priority Data
Oct. 30, 2019 (JP) ................. 2019-197902

(51) Int. Cl.
| | | |
|---|---|---|
| C08K 5/55 | (2006.01) | |
| C08F 22/14 | (2006.01) | |
| C08K 9/06 | (2006.01) | |
| C09J 11/04 | (2006.01) | |
| C09J 11/06 | (2006.01) | |
| C09J 135/02 | (2006.01) | |
| C09K 3/10 | (2006.01) | |

(52) U.S. Cl.
CPC ............... *C08K 5/55* (2013.01); *C08F 22/14* (2013.01); *C08K 9/06* (2013.01); *C09J 11/04* (2013.01); *C09J 11/06* (2013.01); *C09J 135/02* (2013.01); *C09K 3/10* (2013.01); *C08K 2201/005* (2013.01); *C08K 2201/011* (2013.01); *C09K 2200/0625* (2013.01)

(58) Field of Classification Search
None
See application file for complete search history.

(56) References Cited

U.S. PATENT DOCUMENTS

| | | | |
|---|---|---|---|
| 4,713,405 A | 12/1987 | Koga et al. | |
| 8,541,495 B2 * | 9/2013 | Ishizaki | C08F 222/326 524/533 |
| 8,968,862 B2 * | 3/2015 | Seo | C09J 4/00 522/170 |
| 9,458,361 B2 * | 10/2016 | Ishizaki | C09J 11/06 |
| 10,266,726 B2 * | 4/2019 | Haufe | C09D 4/00 |
| 11,897,978 B2 * | 2/2024 | Nebioglu | C08F 290/067 |
| 2005/0209400 A1 | 9/2005 | Tsumura et al. | |
| 2009/0306307 A1 | 12/2009 | Ahn et al. | |
| 2011/0251318 A1 * | 10/2011 | Ishizaki | C08F 222/326 524/208 |
| 2014/0045969 A1 * | 2/2014 | Klapdohr | C09J 11/06 524/590 |
| 2016/0062016 A1 * | 3/2016 | Lee | C09D 133/14 522/64 |
| 2016/0152773 A1 * | 6/2016 | Murakami | C08G 73/1035 522/170 |
| 2017/0203476 A1 | 7/2017 | Obata et al. | |
| 2019/0062612 A1 | 2/2019 | Chen | |
| 2020/0247019 A1 | 8/2020 | Obata et al. | |

FOREIGN PATENT DOCUMENTS

| | | | | |
|---|---|---|---|---|
| EP | 2371914 A1 | * | 10/2011 | ............ C09J 133/14 |
| EP | 3124509 A1 | * | 2/2017 | ............. C07F 17/02 |
| JP | S62-20577 A | | 1/1987 | |
| JP | 2001089626 A | * | 4/2001 | |
| JP | 2006-206919 A | | 8/2006 | |
| JP | 2011241290 A | * | 12/2011 | |
| JP | 2012246328 A | * | 12/2012 | |
| JP | 5541226 B2 | * | 7/2014 | |
| JP | 2014-221892 A | | 11/2014 | |
| JP | 2014-221893 A | | 11/2014 | |
| JP | 2016-008230 A | | 1/2016 | |
| JP | 2016-079313 A | | 5/2016 | |
| JP | 2016172801 A | * | 9/2016 | |
| JP | 2019-123824 A | | 7/2019 | |
| WO | 2019/046200 A1 | | 3/2019 | |

OTHER PUBLICATIONS

European Patent Office, "Extended European Search Report with Search Opinion for European Patent Application No. 20883126.3," Oct. 9, 2023.
Seyfi Javad et al., "Fabrication of robust and thermally stable superhydrophobic nanocomposite coatings based on thermoplastic polyurethane and silica nanoparticles," Applied Surface Science, Elsevier, Amsterdam , NL, vol. 347, Apr. 22, 2015, pp. 224-230, XP029160234, ISSN: 0169-4332, DOI: 10.1016/J.APSUSC.2015.04.112 p. 225, paragraph 2.1.
Khans A et al., "Dynamic rheological behavior of flocculated fumed silica suspensions," Journal of Rheology, Society of Rheology, US, vol. 37, No. 6, Nov. 1, 1993, pp. 1225-1235, XP008154063, ISSN: 0148-6055, DOI: 10.1122/1.550378, table 1.
Nargiello R Maria et al., "Improved Rheological and Suspension Characteristics of Epoxy-Amine Systems With Hydrophobic Fumed Silicas," 46th Annual Conference, Composites Institute, Society of the Plastics Industry Inc. Feb. 18, 1991, pp. 1-04, XP000253547, p. 1, paragraph 2.
PCT/ISA/210, "International Search Report for International Application No. PCT/JP2020/038515," Dec. 22, 2020.

(Continued)

*Primary Examiner* — Sanza L. McClendon
(74) *Attorney, Agent, or Firm* — HAUPTMAN HAM, LLP

(57) ABSTRACT

The present invention relates to a curable resin composition, etc., having an excellent transparency, applicability, and workability. Specifically, the present invention relates to a resin composition, etc., including: (A) a polymer having two or more (meth)acryloyl groups in one molecule thereof; (B) a silica powder surface-treated with an alkyl silane; and (C) boric acid or a borate ester.

20 Claims, No Drawings

(56) References Cited

OTHER PUBLICATIONS

Japan Patent Office, Notice of Reasons for Refusal for Japanese Application No. 2021-554294 mailed on Mar. 31, 2025; 5 pp.

* cited by examiner

RESIN COMPOSITION

RELATED APPLICATIONS

The present application is National Phase of International Application No. PCT/JP2020/038515 filed Oct. 12, 2020, and claims priority from Japanese Application No. 2019-197902, filed Oct. 30, 2019, the disclosure of which is hereby incorporated by reference herein in its entirety.

TECHNICAL FIELD

The present invention relates to a resin composition excellent in transparency, applicability, and workability.

BACKGROUND ART

For adhesives, sealants, coating agents, and the like, it is a general practice to adjust the viscosity and the thixotropy of a resin in order to improve the workability at the time of the application. Particularly, it is an essential technique in using adhesives and sealants to increase the thixotropy to adjust the flowability, making it possible to apply the agent onto a vertical surface and preventing the agent from flowing into unnecessary areas, resulting in failure. As general approaches to increasing thixotropy, various approaches have been conducted, such as a method that adds a filler to an adhesive or a sealant and a method that adds a compound that has poor compatibility with a binder resin serving as a base to an adhesive or a sealant to chemically cause repulsion with the resin serving as the base, thus expressing high thixotropy (Patent Literature 1).

CITATION LIST

Patent Literatures

Patent Literature 1: Japanese Patent Application Publication No. 2014-221893

SUMMARY OF INVENTION

However, in the conventional method that adds a tiller to improve the thixotropy, the light transmittance of the resin is reduced by an increase in amount of the tiller added. In addition, the method that adds a compound that has poor compatibility with a binder to improve the thixotropy has a problem that the resin becomes cloudy.

As a result of earnestly studying in order to solve the above problems, the present inventors have found an approach to obtaining a resin composition excellent in applicability and workability by effectively imparting thixotropy while maintaining transparency, and achieved the present invention. Note that the thixotropy is also called thioxotropy and a thixotropic property, and when the thixotropy is better, the viscosity of a paint becomes lower in a high shear rate state like when the paint is applied, while the viscosity of the paint becomes higher in a low shear rate state like after the application, so that appropriate application can be completed without allowing the paint after the application to flow down (sag).

The invention of the present application may be any of the following [1] to [13]. What are obtained by combining specific elements described in [1] to [13] as appropriate are also encompassed within the range of the invention of the present application.

[1]
A resin composition comprising:
(A) a polymer having two or more (meth)acryloyl groups in one molecule thereof;
(B) a silica powder surface-treated with an alkyl silane; and
(C) boric acid or a borate ester.

[2]
The resin composition according to the above [1], wherein
the component (C) is a compound represented by the following general formula (1):

$$B-(OR)_3 \qquad (1)$$

wherein R may be the same as or different from one another, and are each hydrogen, or a functional group selected from an alkyl group, an aryl group, a carbonyl group, and an acetyl group each having 1 to 6 carbon atoms which may have a substituent.

[3]
The resin composition according to the above [1] or [2], wherein
the silica powder of the component (B) is a fumed silica powder.

[4]
The resin composition according to any one of the above [1] to [3], wherein
the number of carbon atoms of an alkyl group of the component (B) is 3 to 15.

[5]
The resin composition according to any one of the above [1] to [3], wherein
an alkyl group of the component (B) is an octyl group.

[6]
The resin composition according to any one of the above [1] to [5], wherein
an average particle size of primary particles of the component (B) is 1 to 300 nm.

[7]
The resin composition according to any one of the above [1] to [6], wherein
a mass ratioofthecomponent(B):the component (C) is 9:1 to 1:9.

[8]
A curable resin composition comprising:
the resin composition according to any one of the above [1] to [7]; and
a radical polymerization initiator.

[9]
A cured product obtained by curing the curable resin composition according to the above [8].

[10]
An adhesive comprising:
the curable resin composition according to the above [8].

[11]
A sealant comprising:
the curable resin composition according to the above [8].

[12]
A method for producing a resin composition comprising:
mixing
(A) a polymer having two or more (meth)acryloyl groups in one molecule thereof,
(B) a silica powder surface-treated with an alkyl silane, and
(C) boric acid or a borate ester.

[13]
A method for producing a cured product comprising the steps of:
producing a resin composition by mixing
(A) a polymer having two or more (meth)acryloyl groups in one molecule thereof,
(B) a silica powder surface-treated with an alkyl silane, and
(C) boric acid or a borate ester;
mixing the resin composition with (D) a radical polymerization initiator; and
producing a cured product by curing the resin composition with light or healing.

Since the resin composition of the present invention can be adjust in thixotropy without impairing transparency, the resin composition of the present invention is very-useful in improving applicability and workability in wide fields that require transparency.

DESCRIPTION OF EMBODIMENTS

Next, the detail of the present invention will be described. Note that preferable aspects, more preferable aspects, and the like exemplified below can be combined with one another as appropriate and used regardless of the expressions of "preferable", "more preferable", and the like, in addition, the descriptions of ranges of numerical values are examples, and ranges obtained by combining as appropriate the upper limit and the lower limit of each range as well as numerical values of Examples can be favorably used regardless of the expressions of "preferable", "more preferable", and the like. Moreover, terms such as "contain" and "comprise" may be read as "consist essentially of" or "consist only of" as appropriate.

Resin Composition

One of aspects of the present invention is a resin composition comprising:
(A) a polymer having two or more meth)acryloyl groups in one molecule thereof;
(B) a silica powder surface-treated with an alkyl silane; and
(C) boric acid or a borate ester.

Component (A)

The component (A) used in the present invention is a polymer having two or more (meth)acryloyl groups, in which the two or more (meth)acryloyl groups are attached to a molecular terminal or a molecular chain thereof. The main chain of the polymer is not particularly limited, and various types of main chains can be used. However, the main chain is preferably a (meth)acrylic copolymer from the viewpoint that it is excellent in transparency and can effectively impart thixotropy.

The polymer of the component (A) has two or more (meth)acryloyl groups in one molecule thereof. The (meth) acryloyl group is also called a (meth)acryl group, and is a concept comprising an acryloyl group and/or a methacryloyl group, and can be expressed, for example, as —C(=O)—CR=CH$_2$ (R is hydrogen or a methyl group). Specifically, the component (A) has two or more, for example, three or more, four or more, or five or more (meth)acryloyl groups as the side chains of the polymer included in the main chain of the polymer of the component (A) in one molecule thereof, and more preferably has one (meth)acryloyl group at each of both terminals, that is, two in total. The (meth)acryloyi groups may be the same as or different from each other, and may be substituted or unsubstituted, and may be present as side chains in the middle of the main chain or may be present at the terminals of the main chain.

The polymerization monomer serving as the structural unit of the polymer included in the main chain of the component (A) is not particularly limited, and various monomers can be used. Examples of the polymerization monomer include (meth)acrylic monomers such as(meth) acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth) acrylate, decyl (meth)acrylate, dodecyl (meth)acrylate, phenyl (meth)acrylate, toluyl (meth)acrylate, benzyl (meth) acrylate, 2-methoxyethyl (meth)acrylate, 3-methoxybutyl (meth)acrylate, hydroxy ethyl (meth)acrylate, 2-aminoethyl (meth)acrylate, (methacryloyloxypropyl)trimethoxysilane, ethylene oxide adducts of (meth)acrylic acid, trifluoromethylmethyl (meth)acrylate, 2-trifluoromethylethyl (meth)acrylate, perfluoroethylethyl (meth)acrylate, 2-perfluoroethylmethyl (meth)acrylate, perfluorohexylethy (meth)acrylate, 2-perfluorodecylethyl (meth)acrylate, and 2-perfluorohexadecylethyl (meth)acrylate; styrene monomers such as styrene, vinyltoluene, α-methylstyrene, chiorostyrene, styrenesulfonic acid and salts thereof; fluorine-containing vinyl monomers such as perfluoroethylene, perfluoropropylene, and vinylidene fluoride; silicon-containing vinyl monomers such as virtyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; vinyl chloride, vinylidene chloride, allyl chloride, allyl alcohols, and the like. One of these monomers may be used alone or two or more of these may be copolymerized. Among these, styrene monomers and (meth)acrylic monomers are preferable from the viewpoint of the physical properties of the product, and the like. Acrylic ester monomers and methacrylic ester monomers are more preferable, acrylic ester monomers are particularly preferable, and butyl acrylate is most preferable. In the present invention, the above monomer may be copolymerized with, or further block-copolymerized with another monomer. In such case, it is preferable that the above polymerization monomer other than the other monomer be contained in an amount of 40% or more, preferably 50% or more, more preferably 60% or more, and further preferably 70% or more, in mass ratio. Note that in the above forms of descriptions, for example, the meth)acrylic acid represents an acrylic acid and/or a methacrylic acid.

The number average molecular weight of the component (A) is preferably 3,000 to 100,000, and particularly preferably 5,000 to 50,000. When the number average molecular weight is 3,000 or more, a soft cured product can be obtained, while when the number average molecular weight is 100,000 or less, the viscosity does not become too high, so that stringing can be suppressed when the resin composition is applied. Note that in the Specification, the number average molecular weight is calculated in accordance with a standard polystyrene conversion method using size-exclusion chromatography (SEC) unless otherwise specified.

The polymer in the present invention can be obtained through various types of polymerization. The method for obtaining the vinyl polymer is not particularly limited, but is preferably the radical polymerization methods from the viewpoint of the versatility of monomers and the easiness of control. Among the radical polymerization, the controlled radical polymerization is preferable, the living radical polymerization is more preferable, and the atom transfer radical polymerization is particularly preferable.

Commercial products of the component (A) include RC200C, IRC210C, RC220C, RC100C, and RC120C (manufactured by Kaneka Corporation), and the like, but is not limited to these. As the component (A), one type may be used alone or a mixture of two or more types may be used.

Component (B)

The component (B) used in the present invention is a silica powder surface-treated with an alkyl silane. When used in combination with the component (C), which will be described later, the component (B) of the present invention can express outstanding thixotropy.

The alkyl silane includes alkyl silane compounds represented by a general formula (2): $Si(R^1)_4$. In the general formula (2), $R^1$ may be the same or different, and are preferably alkyl groups having 3 to 15 carbon atoms, further preferably alkyl groups having 5 to 10 carbon atoms, and most preferably alkyl groups having 8 to 10 carbon atoms, from the viewpoint that these are well-blended and dispersed in the component (A) and have effect to express very high thixotropy with the component (B). Specific examples of $R^1$ of the above general formula (2) include a propyl group, an isopropyl group, a butyl group, an isobutyl group, a pentyl group, an isopentyl group, a hexyl group, an isohexyl group, a heptyl group, an isoheptyl group, an octyl group, an isooctyl group, a nonyl group, an isononyl group, a decyl group, and an isodecyl group, but an octyl group is preferable.

The silica powder of the component (B) is preferably a fumed silica powder. The fumed silica powder is made of silicon dioxide obtained by the flame hydrolysis method, in which particles in the form of perfect sphere are formed, and multiple particles are aggregated and fused in the form of beads to form bulky agglomerates.

The average particle size of primary particles of the silica powder surface-treated with an alkyl slime of the component (B) is preferably 1 to 300 nm, further preferably 3 to 100 nm, and most preferably 5 to 50 nm. Note that the average particle size of the primary particles mentioned in the present invention can be measured and calculated by a general method such as the centrifugal sedimentation light transmission method, the laser diffraction method, or a method that measures particle sizes with transmission electron microscope; however, the average particle size of the primary particles mentioned herein is a numerical value obtained by measuring the major radius and the minor radius of a two-dimensional projection image of each primary particle using a transmission microscope and averaging the measured values in compliance with HS H 7804:2005.

In addition, the BET specific surface area of the silica powder surface-treated with an alkyl silane of the component (B) is preferably 300 $m^2/g$ or less, and further preferably 250 $m^2/g$ or less, from the viewpoint of the packing factor with the component (A). Note that the lower limit value of the BET specific surface area is not particularly limited, but it is appropriate that the lower limit value is, for example, 100 $m^2/g$ or more, and preferably 150 $m^2/g$ or more.

The apparent specific gravity of the silica powder surface-treated with an alkyl silane of the component (B) is preferably 1 or more and less than 100 g/l, and more preferably 10 g/l or more and less than 80 g/l, from the viewpoint of preventing sedimentation of the component (B) with time. The apparent specific gravity mentioned in the Specification is a value measured by measuring the apparent density after tapping is sufficiently conducted, in compliance with DIN ISO 787-11.

The content of the component (B) is preferably 0.01 to 100 parts by mass, further preferably 0.1 to 50 parts by mass, and most preferably 0.5 to 30 parts by mass, relative to 100 parts by mass of the component (A). When the content of the component (B) is 0.01 to 100 parts by mass, it is possible to control the viscosity while maintaining the performance of the resin composition.

Commercial products of the component (B) include AEROSIL R805 (manufactured by Evonik Industries AG), CAB-o-SIL TS-530 (manufactured by CABOT Corporation), and the like.

Component (C)

The component (C) which can be used in the present invention includes boric acid or a borate ester. The component (C) is a main component which suppresses an increase in viscosity of the resin composition and increases a thixotropy imparting effect. The component (C) is particularly preferably a borate ester from the viewpoint of the thixotropy imparting effect and the compatibility with the component (A).

As the borate ester, any desired borate ester can be used, but is more preferably a compound which is represented by the following general formula (1) and which has one borate ester in a molecule thereof in the present invention.

   (1)

Here, in the formula (I), R are each hydrogen, or a functional group selected from an alkyl group, an aryl group, a carbonyl group, and an acetyl group each having 1 to 6 carbon atoms which may have a substituent, and all of three R may be the same or different. The compound includes trialkyl borate compounds such as trimethyl borate, triethyl borate, tripropyl borate, tributyl borate, tripentyl borate, trihexyl borate, triphenyl borate, tri-o-tolyl borate, triisopropyl borate, tri-n-octyl borate, tridecyl borate, and tetradecyl borate, and tributyl borate is preferable from the viewpoint of the preservation stability of the resin composition.

The content of the component (C) is preferably 0.05 to 20 parts by mass, further preferably 0.1 to 10 parts by mass, and most preferably 0.2 to 7 parts by mass, relative to 100 parts by mass of the component (A). When the content of the component (C) is 0.05 to 20 parts by mass, it is possible to maintain the properties without affecting the reactivity or the preservation stability as the resin composition, The mass ratio of the component (B) to the component (C) is for example such that component (B):component (C)=15:1 to 1:15, preferably 9:1 to 1:9, further preferably 8:2 to 2:8, and most preferably 7:3 to 3:7.

Optional Component

The resin composition of the present invention may contain an optional component different from the above components (A) to (C), such as a filler, an antioxidant, a light stabilizer, a preservation stabilizer, an antifoam, a coupling agent, a leveling agent, a dispersant, a pH adjuster, a rheology controlling agent, a solvent, an adhesion promoter, a plasticizer, a pigment, a flame retardant, and a surfactant, besides the above components (A) to (C) as long as the object of the present invention is not impaired. Adding these makes it possible to obtain a resin composition excellent in applicability, film formation, preservation stability, and the like.

A filler in such an amount that does not impair the preservation stability may be added to the present invention for the purpose of improving elastic modulus, resin strength, fluidity, and the like of the cured product. Specifically, such filler includes organic powders, inorganic powders, metallic powders, and the like. Fillers of inorganic powders include glass, alumina, mica, ceramic, a silicone rubber powder, calcium carbonate, aluminum nitride, a carbon powder, kaolin clay, dried clay mineral, dried diatomite, and the like. The amount of an inorganic powder to be blended is preferably about 0.1 to 100 parts by mass relative to 100 parts by mass of the component (A). When the amount is 100 parts by mass or less, it is possible to obtain sufficient fluidity as the resin composition and to thus obtain favorable workability.

Fillers of organic powders include, for example, polyethylene, polypropylene, nylon, cross-linked acrylic, cross-linked polyethylene, polyester, polyvinyl alcohol, polyvinyl butyral, and polycarbonate. The amount of the organic powder to be blended is preferably about 0.1 to 100 parts by mass relative to 100 parts by mass of the component (A). When the amount is more than 0.1 parts by mass, the effect does not decrease, while when the amount is 100 parts by mass or less, it is possible to obtain sufficient fluidity as the resin composition and to thus obtain favorable workability.

Fillers of metallic powders include, for example, gold, platinum, silver, copper, indium, palladium, nickel, alumina, tin, iron, aluminum, stainless steel, and the like. The amount of the metallic powder to be blended is preferably about 0.1 to 100 parts by mass, and more preferably 1 to 50 parts by mass, relative to 100 parts by mass of the component (A).

The antioxidant includes, for example, quinone compounds such as β-naphthoquinone, 2-methoxy-1,4-naphthoquinone, methylhydroquinone, hydroquinone, hydroquinone monomethyl ether, mono-tert-butylhydroquinone, 2,5-di-tert-butylhydroquinone, p-benzoquinone, 2,5-diphenyl-p-benzoquinone, and 2,5-di-tert-butyl-p-benzoquinone; phenols such as phenothiazine, 2,2-methylene-bis(4-methyl-6-tert-butylphenol), catechol, tert-butylcatechol, 2-butyl-4-hydroxy anisole, 2,6-di-tert-butyl-p-cresol, 2-tert-butyl-6-(3-tert-butyl-2-hydroxy-5-methylbenzyl)-4-methylphenylacrylate, 2-[1-(2-hydroxy-3,5-di-tert-penylphenyl)ethyl]-4,6-di-tert-pentylphenylacrylate, 4,4'-butylidenebis(6-tert-butyl-3-methylphenol) 4,4'-thiobis(6-tert-butyl-3-methylphenol), 3,9-bis[2-[3-(3-tert-butyl-4-hydroxy-5-methylphenyl)propionyloxy]-1,1-dimethylethyl]-2,4,8,10-tetraoxaspiro[5,5]undecane, pentaerythritoltetrakis[3-(3,5-di-tert-butyl-4-hydroxyphenyl)propipnate], thiodiethylenebis[3-(3,5-di-tert-butyl-4-hydroxyphenyl)propipnate], octadecyl-3-(3,5-di-tert-butyl-4-hydroxyphenyl)propipnate, N,N'-hexane-1,6-diyl-bis[3-(3,5-di-tert-butyl-4-hydroxyphenyl)propionamide], benzenepropanoic acid, 3,5-bis(1,1-dimethylethyl)-4-hydroxy, C7-C9 branched alkyl ester, 2,4-dimethyl-6-(1-methylpentadecyl)phenol, diethyl[[3,5-bis(1,1-dimethylethyl)-4-hydroxyphenyl]methyl]phosphonate, 3,3',3''',5,5',5''-hexa-tert-butyl-a,a',a''-(mesitylene-2,4,6-tolyl)tri-p-cresol, calciumdiethylbis[[3,5-bis(1,1-dimethylethyl)-4-hydroxyphenyl]methyl]phosphonate, 4,6-bis(octylthiomethyl)-o-cresol, ethylenebis(oxyethylene)bis[3-(5-tert-butyl-4-hydroxy-m-tolyl)propipnate], hexamethylenebis[3-(3,5-di-tert-butyl-4-hydroxyphenyl)propipnate, 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-triazine-2,4,6(1H,3H,5H)-trione, a reaction product of N-phenyl benzenamine and 2,4,6-trimethylpentene, 2,6-di-tert-butyl-4-(4,6-bis(octylthio)-1,3,5-triazine-2-ylamino)phenol, picric acid, and citric acid; phosphorus compounds such as tris(2,4-di-tert-butylphenyl)phosphite, tris[2-[[2,4,8,10-tetra-tert-butyldibenzo[d,f][1,3,2]dioxaphosphepin-6-yl]oxy]ethyl]amine, bis(2,4-di-tert-butylphenyl)pentaerythritol diphosphite, bis[2,4-bis(1,1-dimethylethyl)-6-methylphenyl]ethyl ester phosphorous acid, tetrakis (2,4-di-tert-butylphenyl)[1,1-bisphenyl]4,4'-diilybisphosphonite, and 6-[3-(3-tert-butyl-4-hydroxy-5-methylphenyl)propoxy]-2,4,8,10-tetra-tert-butyldibenz[d,f][1,3,2]dioxaphosphepin; amine compounds such as phenothiazine; lactone compounds; vitamin E compounds, and the like. Among these, phenol compounds are preferable.

The light stabilizer includes, for example, hindered amines such as bis(2,2,6,6-tetramethyl-4-piperidypsebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]ethyl]-4-[3-(3,5-ditert-butyl-4-hydroxyphenyl)propionyloxy]-2,26,6-tertramethylpiperidine, 1,2,2,6,6-pentamethyl-4-piperidinyl-methacrylate, bis(2,2,2,6,6-pentamethyl-4-peperidinyl)[[3,5-bis(1,1-dimethylethyl)-4-hydroxyphenyl]methyl]butylmalonate, decanedioic acid bis(2,2,6,6-tetramethyl-1(octyloxy)-4-peperidinyl) ester, a reaction product of 1,1-dimethylethyl hydroperoxide and octane, N,N',N'',N'''-tetrakis-(4,6-bis-(butyl-(N-methyl-2,2,6,6-tetramethylpiperidine-4-yl)amino)-triazin-2-yl)-4,7-diazadecane-1,10-diamine, a polycondensate of dibutylamine-1,3, 5-triazine-N,N'-bis(2,2,6,6-tetramethyl-4-piperidyl-1,6-hexamethylenediamine and N-(2,2,6,6-tetramethyl-4-piperidyl)butylamine, poly[[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]], a polymer of dimethyl succinate and 4-hydroxy-2,2,6,6-tetramethyl-1-piperidineethanol, 2,2,4,4-tetramethyl-20-(β-lauryloxycarbonyl)ethyl-7-oxa-3,20-diazadispiro[5,1,11,2]heneicosane-21-one, β-alanine, N-(2,2,6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro[5,1,11,2]heneicosane-21-one, 2,2,4,4-tetramethyl-21-oxa-3,20-diazadicyclo-[5,1,11,2]-heneicosane-20-propanoic acid dodecyl ester/tetradecyl ester, propanedioic acid, [(4-methoxyphenyl)-methyene]-bis(1,2,2,6,6-pentamethyl-4-piperidinyl) ester, a higher fatty acid ester of 2,2,6,6-tetramethyl-4-piperidinol, 1,3-benzenedicarboxamide, and N,N'-bis(2,2,6,6-tetramethyl-4-piperidinyl), benzophenone compounds such as octabenzone; benzotriazole compounds such as 2-(2H-benzotriazol-2-yl)-4-(1,1,3,3-tetramethylbutyl)phenol, 2-(2-hydroxy-5-methylphenyl)benzotriazole, 2-[2-hydroxy-3-(3,4,5,6-tetrahydrophthalimide-methyl)-5-methylphenyl] benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl3-(3-(2H-benzotriazol-2-yl)-5-tert-butyl-4-hydroxyphenyl) propipnate and polyethylene glycol, and 2-(2H- benzotriazol-2-yl)-6-dodecyl-4-methylphenol; benzoate compounds such as 2,4-di-tert-butylphenyl-3,5-di-tert-butyl-4-hydroxybenzoate; triazine compounds such as 2-(4,6-diphenyl-1,3,5-triazine-2-yl)-5-[(hexyl)oxy]phenol, and the like. Hindered amine compounds are particularly preferable.

It is appropriate for example that the amount of the optional component contained in the resin composition of the present invention is, for example, 0.05 to 100 parts by mass, preferably 0.1 to 50 parts by mass, and more preferably 0.2 to 20 parts by mass, relative to 100 parts by mass of the component (A).

The present invention may contain a (meth)acrylic monomer other than the component (A) as long as the properties are maintained. The (meth)acrylic monomer is a compound having one or more (meth)acryloyl groups in a molecule thereof.

As the (meth)acrylic monomer, a conventionally known substance can be used, and for example, a monofunctional (meth)acrylate or a polyfunctional (meth)acrylate can be used. The polyfunctional (meth)acrylate includes bifunctional (meth)acrylates and trifunctional or higher polyfunctional (meth)acrylates. Here, the monofunctional (meth)acrylate includes, for example, (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, isononyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidy (meth)acrylate, 2-aminoethyl (meth)acrylate, γ-(meth)acryloyloxypropyltrimethoxysilane, ethylene oxide adducts of (meth)acrylic acid, trifluoromethylmethyl (meth)acrylate, 2-trifluoromethylethyl (meth)acrylate, glycerol (meth)acrylate, polyethylene glycol (meth)acrylate, polypropylene glycol (meth)acrylate, epichlorohydrin (hereinafter abbreviated as ECH)-modified butyl(meth)actylate, ECH-modified phenoxy (meth)acrylate, ethylene oxide (hereinafter abbreviated as EO)-modified phthalic acid (meth)acrylate, EO-modified succinic acid (meth)acrylate, caprolactone-modified 2-hydroxyethyl (meth)acrylate. (meth)acrylamide, N,N-dimethylaminoethyl (meth)acrylate, N,N-diethylaminoethyl (meth)acrylate, morpholino (meth)acrylate, EO-modified phosphoric acid (meth)acrylate, and the like. The polyfunctional (meth)acrylate includes, for example, bifunctional (meth)acryl group-containing compounds such as 1,3-butylene glycol di(meth)acrylate, 1,4-butylene glycol di(meth)acrylate, neopentylglycol di(meth)acrylate, 1,6-hexane glycol di(meth)acrylate, ethylene glycol di(meth)acrylate, polyethylene glycol di(meth)acrylate, propylene glycol di(meth)acrylate, tripropylene glycol di(meth)acrylate, EO-modified neopentylglycol di(meth)acrylate, propylene oxide (hereinafter abbreviated as PO)-modified neopentylglycol di(meth)acrylate, bisphenol A di(meth)acrylate, EO-modified bisphenol A di(meth)acrylate, ECH-modified hisphenol A di(meth)acrylate, EO-modified hisphenol S di(meth)acrylate, hydroxypivalic acid ester neopentylglycol di(meth)acrylate, caprolactone-modified hydroxypivalic acid ester neopentylglycol di(meth)acrylate, neopentylglycol-modified trimethylolpropane di(meth)acrylate, stearic acid-modified pentaerythritol di(meth)acrylate, dicyclopentenyl di(meth)acrylate, EO-modified dicyclopentenyl di(meth)acrylate, and di(meth)acryloyl isocyanurate, and multifunctional (meth)acryl group-containing compounds such as trimethylolpropane tri(meth)acrylate, pentaerythritol tri(meth)acrylate, EO-modified trimethylolpropane tri(meth)acrylate, PO-modified trimethylolpropane tri(meth)acrylate, ECH-modified trimethylolpropane tri(meth)acrylate, ECH-modified glycerol tri(meth)acrylate, tris(acryloyloxyethyl) isocyanurate, ditrimethylolpropane tetra(meth)acrylate, pentaerythritol tetra(meth)acrylate, di pentaerythritol monohydroxy penta (meth)acrylate, alkyl-modified dipentaerythritol penta acrylate, dipentaerythritol hexa(meth)acrylate, and caprolactone-modified dipentaerythritol hexa(meth)acrylate. One of these (meth)acrylic monomers may be used alone or two or more of these may be used in combination.

In the present invention, the content of the (meth)acrylic monomer is preferably 5 to 60 parts by mass, and more preferably 10 to 50 parts by mass, relative to 100 parts by mass of the component (A). When the content of the (meth)acrylic monomer is 5 to 60 parts by mass, it is possible to maintain curability as a curable resin composition.

Curable Resin Composition

The resin composition of the present invention may be made into a curable resin composition by further adding a radical polymerization initiator as a component (D). A cured product of the curable resin composition can be obtained by further curing the curable resin composition under desired conditions. The curable resin composition of the present invention may be used as a two-liquid curable resin composition kit for which several components are separately prepared and stored, and are then mixed in use, besides a one-liquid curable resin composition which is obtained by mixing all components.

Here, the radical polymerization initiator as the component (D) includes a photo-radical polymerization initiator, a thermal radical polymerization initiator, and the like. As the form of curing the curable resin composition of the present invention, photo-curing, heat curing, or redox curing can be selected by selecting the radical polymerization initiator. For example, regarding the curable resin composition, a photo-radical polymerization initiator may be selected in the case where photo-curability is desired to be imparted, and an organic peroxide, which is a thermal radical polymerization initiator, or the like may be selected in the case where thermal curability or curability by redox reaction is desired to be imparted.

The photo-radical polymerization initiator is not particularly limited as long as the photo-radical polymerization initiator is a compound which generates radicals when irradiated with an active energy ray, Specific examples of the photo-radical polymerization initiator include acetophenones such as diethoxyacetophenone, 2-hydroxy-2-methyl-1-phenylpropane-1-one, benzil dimethylketal, 4-(2-hydroxyethoxy)phenyl-(2-hydroxy-2-propyl)ketone, 1-hydroxycyclohexylphenylketone, 2-hydroxy-1-{4-[4-(2-hydroxy-2-methyl-propionyl)-benzyl]phenyl}-2-methyl-propane-1-one, methylbenzoylformate, 2-methyl-2-morpholino(4-thiomethylphenyl)propane-1-one, 2-benzyl-2-dimethylamino-1-(4-morpholinophenyl)butanone, and 2-hydroxy-2-methyl-1-[4-(1-methylvinyl)phenyl]propanone oligomer; benzoins such as benzoin, benzoin methyl ether, benzoin ethyl ether, benzoin isopropyl ether, and benzoin isobutyl ether; benzophenones such as benzophenone, methyl-o-benzoylbenzoate, 4-phenyl benzophenone, 4-benzoyl-4'-methyl-diphenyl sulfide, 3,3',4,4'-tetra(t- butylperoxycarbonyl)benzophenone, 2,4,6-trimethylbenzophenone, 4-benzoyl-N,N-dimethyl-N-[2-(1-oxo-2-propenyloxy)ethyl]benzenemethanaminium bromide, and (4-benzoylbenzyl)trimethylammonium chloride; thioxanthenes such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthon-9-one mesochloride, and the like. Among these, 1-hydroxycyclohexylphenylketone, 2-hydroxy-1-{4-[4-(2-hydroxy-2-methyl-propionyl)-benzyl]phenyl}-2-methyl-propane-1-one, methylbenzoylformate, and 2-hydroxy-2-methyl-1-phenylpropane-1-one are preferable, and 1-hydroxycyclohexylphenylketone is particularly preferable from the viewpoint of versatility. Note that one of the above photo-radical polymerization initiators may be used alone or two or more of these may be used in combination.

In addition, in the present invention, it is preferable that the resin composition contain a visible light-type photo-radical polymerization initiator as the component (D) from the viewpoint of suppressing yellowing when the resin composition is cured. The visible light-type photo-radical polymerization initiator is a photopolymerization initiator that exhibits maximum absorption of light in a visible light region, and mainly includes acyl phosphene oxide-based photo-polymerization initiators having phosphorus atoms. Specifically, the visible light-type photo-radical polymerization initiator includes 2,4,6-trimethylbenzoyl-diphenylphosphine oxide, bis(2,4,6-trimethylbenzoyl)-phenylphosphine oxide, and the like, and among these, 2,4,6-trimethylbenzoyl-diphenylphosphine oxide is particularly preferable from the viewpoint of improving the photo-curability.

Here, the active energy ray includes radioactive rays such as γ-rays and X-rays having a wavelength of less than 100 nm, ultraviolet rays having a wavelength of 100 nm to 400 nm, visible light having a wavelength of 400 to 800 nm, and the like. A visible light having a wavelength of 400 to 800 nm is preferable in order to make it possible to cure a material that is weak to ultraviolet rays and a material that is unlikely to transmit ultraviolet rays.

The thermal radical polymerization initiator includes organic peroxides, and includes, for example, hydroperoxides such as cumene hydroperoxide, t-butyl hydroperoxide, p-methane hydroperoxide, methyl ethyl ketone peroxide, cyclohexane peroxide, dicumyl peroxide, and diisopropylbenzene hydroperoxide, and also ketone peroxides, diallyl peroxides, peroxyesters, and the like. One of these organic peroxides may be used alone or two or more of these may be used in combination.

In the present invention, the content of the component (D) is 1 to 20 parts by mass relative to 100 parts by mass of the component (A). When the content of the component (C) is 1 to 20 parts by mass, it is possible to achieve both the curability and the preservation stability.

Usage

The resin composition of the present invention is used as part of materials of a curable resin composition for use in a sealant, an adhesive, and a coating agent. The curable resin composition of the present invention may be used as a sealant, an adhesive, and a coating agent. A cured product obtained by curing the curable resin composition of the present invention may be used as a seal layer or a seal portion formed by curing the above sealing material, an adhesive layer or an adhesive portion formed by curing the above adhesive, or a coating layer or a coating portion formed by curing the above coating agent.

Applying Method

As the method for applying the resin composition and the curable resin composition of the present invention to an object to be coated, publicly-known methods for sealants, adhesives, and the like are used. For example, methods such as dispensing, spray, inkjet, screen printing, gravure printing, dipping, and spin-coating using automatic applicators can be used. Note that it is preferable that the resin composition and the curable resin composition of the present invention are liquids at 25° C. from the viewpoint of applicability.

Curing Method and Cured Product

The curable resin composition of the present invention may be cured by a publicly-known method using photo-curing, heat curing, or redox curing to obtain a cured product, More specifically, an example of the method is a method for producing a cured product comprising the steps of:

producing a resin composition by mixing the above components (A) to (C) and the above optional component as necessary;

mixing the resin composition with a radical polymerization initiator as the component (D); and producing a cured product by curing the resin composition with light or heating.

The component (D) includes a photo-radical polymerization initiator, a thermal radical polymerization initiator, and the like as polymerization initiators as described above. In the case where a photo-radical polymerization initiator is used for curing the resin composition according to the present invention, a cured product can be obtained by curing the resin composition with light irradiation, in this case, the light for irradiation may be either of an ultraviolet ray and a visible light. The light source to be used is not particularly limited, and for example, a low-pressure mercury lamp, a medium-pressure mercury lamp, a high-pressure mercury lamp, an ultra high-pressure mercury lamp, a black-light lamp, a microwave-excited mercury lamp, a metal-halide lamp, a sodium-vapor lamp, a halogen lamp, a xenon arc lamp, an LED, a fluorescent lamp, sunlight, an electron beam irradiation device, and the like can be used. The integral alight for light irradiation is preferably 30 kJ/m$^2$ or less and preferably 5 kJ/cm$^2$ or more from the viewpoint of curing efficiency.

In the case where a thermal radical polymerization initiator is used as the component (D), a cured product can be obtained by heat curing. The heating temperature is not particularly limited, but is preferably 30 to 300° C., further preferably 50 to 200° C., and most preferably 60 to 150° C. The curing time is not particularly limited, but is preferably 1 minute or more and less than 3 hours in the case where the heating temperature is 30 to 300° C.

It is preferable that the cured product formed from the resin composition do not develop yellowing and have a colorless and transparent appearance. Specifically, the transmittance of the cured product at a wavelength of 400 nm is preferably 10.0% or more, and more preferably 20.0% or more. Note that the transmittance is in compliance with JIS K 0115, and the transmittance of light passing through a sample having a thickness of 10 mm is measured, for example, using ultraviolet-visible spectrophotometer UV-2450 manufactured by Shimadzu Corporation.

Method for Producing Resin Composition

The resin composition of the present invention is produced by mixing each component. The order of mixing each component is not particularly limited, and it is possible to add and mix all the components at once or to add and mix the components one by one.

It is possible to further add a curing component such as a radical polymerization catalyst to the resin composition of the present invention to obtain a curable resin composition. Specifically, the curable resin composition is produced in accordance with the following procedures;

a step of mixing the components (A) to (C) and an optional component while agitating; and a step of further adding the component (D) and mixing them while agitating optionally under a reduced pressure.

EXAMPLES

Next, the present invention will be described in further detail giving Examples. However, the present invention is not limited to only these Examples.

Example 1 and Comparative Examples 1 to 6

The following components were prepared in order to prepare desired resin compositions.

Component (A): XMAP RC100C (manufactured by Kaneka Corporation): An acrylic copolymer having one acryloyl group at each of both terminals Component (B): AEROSII, R805 (manufactured by Evonik Industries AG): A fumed silica powder surface-treated with octyl-silane, the average particle size of primary particles 12 nm, the BET specific surface area 150 m²/g, the apparent specific gravity 60 g/l Component (B'): AEROSIL 200 (manufactured by NIPPON AEROSIL CO., LTD.): An untreated silica powder, the average particle size of primary particles 12 nm. the BET specific surface area 200 m²/g, the apparent specific gravity 50 g/l Component (C): Tributyl borate (reagent)
Component (C'-1): Phosphoric acid (reagent)
Component (C'-2): Methacrylic acid (manufactured by MITSUBISHI RAYON CO., LTD.)
Component (C'-3): Acetic acid (reagent)

The component (A) was weighed in an agitation container, and the component (B) was weighted in the agitation container, followed by agitation for 30 minutes. The component (C) was weighted, followed by agitation for 10 minutes to obtain each resin composition. Detailed preparation amounts were in accordance with Table 1, and all numerical values are expressed in parts by mass. All the tests were conducted at 25° C.

Viscosity

The viscosity (Pa·s) of each curable resin composition was measured using a cone and plate viscometer based on the following measurement conditions. The viscosity (Pa·s) was evaluated based on the following criteria, and results are shown in Table 1.

Shear rate: $1.0\ s^{-1}$
Measurement time: 3 min
Temperature condition: 25° C.
Amount of resin: 0.5 mL The measurement of the viscosity makes it possible to evaluate whether or not the sample has a low viscosity in a high shear rate state at the time of application of the sample out of the thixotropy of the sample.

Evaluation of Sagging Property

The sagging property refers to a measurement of how much an applied paint or the like moves in a vertical direction after a predetermined period of time elapses from when the paint is applied to an applied surface. The measurement of the sagging property makes it possible to evaluate whether or not the sample has a high viscosity in a low shear rate state after the application of the sample out of the thixotropy of the sample. Specifically, a gauge line was drawn at a position 10 mm from a short side of a test piece (having a thickness of 1.0×a short side of 25×a long side of 100 mm) of SUS304, and a beat of each resin composition having Φ=2.5 mm was applied onto the gauge line using a dispenser. The test piece was placed vertically under an environment of 25° C., and the distance by which the resin composition moved from the gauge line was measured after 60 minutes. It was determined that the resin composition whose traveled distance after the elapse of 60 minutes was less than 5 mm was passed. Note that during the measurement of the sagging property, easiness of application and easiness of work along therewith were also evaluated for the applicability and the workability.

TABLE 1

|     |                  | Example 1 | Comparative Example 1 | Comparative Example 2 | Comparative Example 3 | Comparative Example 4 | Comparative Example 5 | Comparative Example 6 |
| --- | ---------------- | --------- | --------------------- | --------------------- | --------------------- | --------------------- | --------------------- | --------------------- |
| (A) | XMAP RC100C      | 100       | 100                   | 100                   | 100                   | 100                   | 100                   | 100                   |
| (B) | R805             | 7.4       |                       | 7.4                   |                       | 7.4                   | 7.4                   | 7.4                   |
| (B')| 200              |           |                       |                       | 7.4                   |                       |                       |                       |
| (C) | Tributyl borate  | 3.7       | 3.7                   |                       | 3.7                   |                       |                       |                       |
| (C')| Phosphoric acid  |           |                       |                       |                       | 3.7                   |                       |                       |
| (C')| Methacrylic acid |           |                       |                       |                       |                       | 3.7                   |                       |
| (C')| Acetic acid      |           |                       |                       |                       |                       |                       | 3.7                   |
|     | Viscosity (Pa · s)| 263      | 62                    | 433                   | 233                   | 466                   | 254                   | 248                   |
|     | Sagging Property mm| 2       | 55                    | 10                    | 8                     | 14                    | 6                     | 6                     |

As shown in Table 1, it can be understood that Example 1 had sufficiently low viscosity and was able to be easily applied. In addition, during the actual measurement of sagging property as well, Example 1 was easily applied, so that the work was able to be favorably conducted. Moreover, regarding the sagging property, Example 1 had a favorable sagging property. On the other hand, Comparative Examples 1 to 6 had unsatisfactory sagging properties. In addition, even those like Comparative Examples 2 and 4 that had higher viscosity than Example 1 had poor sagging properties.

Light Transmittance

The light transmittance at each wavelength of each of the resin composition of Example 1 and the component (A) was measured using ultraviolet-visible spectrophotometer UV-2450 manufactured by Shimadzu Corporation. The test was in compliance with JIS K 0115, and the light transmittance was measured while the thickness (optical path length) of the sample through which light at each wavelength passed was set to 10 mm.

TABLE 2

|  | Wavelength of light | Example 1 | Component (A) |
|---|---|---|---|
| Transmittance % | 300 nm | 2 | 2 |
|  | 365 nm | 36 | 36 |
|  | 400 nm | 59 | 58 |

As shown in Table 2, no increase was observed when the transmittance of the component (A) and the transmittance of the resin composition of Example 1 were compared. Accordingly, it was understood that the resin composition of Example 1 maintained transparency regardless of containing the filler.

INDUSTRIAL APPLICABILITY

Since the resin composition of the present invention can effectively impart thixotropy without impairing transparency, and can be widely developed in fields that require transparency, the resin composition of the present invention is very useful.

What is claimed is:

1. A resin composition comprising:
(A) a polymer having two or more (meth)acryloyl groups in one molecule thereof;
(B) a silica powder surface-treated with an alkyl silane; and
(C) boric acid or a borate ester, wherein
a mass ratioofthecomponent(B):the component (C) is 9:1 to 1:9, and
said two or more (meth)acryloyl groups are represented by —C(=O)—CR=CH$_2$, wherein R is hydrogen or a methyl group.

2. The resin composition according to claim 1, wherein the component (C) is a compound represented by the following general formula (1):

B—(OR)$_3$     (1)

wherein R may be the same as or different from one another, and are each hydrogen, or a functional group selected from an alkyl group, an aryl group, a carbonyl group, and an acetyl group each having 1 to 6 carbon atoms which may have a substituent.

3. The resin composition according to claim 1, wherein the silica powder of the component (B) is a fumed silica powder.

4. The resin composition according to claim 1, wherein the number of carbon atoms of an alkyl group of the component (B) is 3 to 15.

5. The resin composition according to claim 1, wherein an alkyl group of the component (B) is an octyl group.

6. The resin composition according to claim 1, wherein an average particle size of primary particles of the component (B) is 1 to 300 nm.

7. The resin composition according to claim 1, wherein the mass ratioofthecomponent(B):the component (C) is 8:2 to 2:8.

8. A curable resin composition comprising:
the resin composition according to claim 1; and
a radical polymerization initiator.

9. A cured product obtained by curing the curable resin composition according to claim 8.

10. An adhesive comprising:
the curable resin composition according to claim 8.

11. A sealant comprising:
the curable resin composition according to claim 8.

12. A method for producing a resin composition comprising:
mixing
(A) a polymer having two or more (meth)acryloyl groups in one molecule thereof,
(B) a silica powder surface-treated with an alkyl silane, and
(C) boric acid or a borate ester, wherein
a mass ratioofthecomponent(B):the component (C) is 9:1 to 1:9, and
said two or more (meth)acryloyl groups are represented by —C(=O)—CR—CH$_2$, wherein R is hydrogen or a methyl group.

13. A method for producing a cured product comprising the steps of:
producing a resin composition by mixing
(A) a polymer having two or more (meth)acryloyl groups in one molecule thereof,
(B) a silica powder surface-treated with an alkyl silane, and
(C) boric acid or a borate ester, wherein
a mass ratioofthecomponent(B):the component (C) is 9:1 to 1:9, and
said two or more (meth)acryloyl groups are represented by —C(=O)—CR=CH$_2$, wherein R is hydrogen or a methyl group;
mixing the resin composition with (D) a radical polymerization initiator; and
producing a cured product by curing the resin composition with light or heating.

14. A curable resin composition comprising:
the resin composition according to claim 1; and
a radical polymerization initiator, wherein the resin composition meets at least one of the following conditions:
(i) the component (C) is a compound represented by the following general formula (1):

B—(OR)$_3$     (1)

wherein R may be the same as or different from one another, and are each hydrogen, or a functional group selected from an alkyl group, an aryl group, a carbonyl group, and an acetyl group each having 1 to 6 carbon atoms which may have a substituent,
(ii) the silica powder of the component (B) is a fumed silica powder,
(iii) the number of carbon atoms of an alkyl group of the component (B) is 3 to 15,
(iv) an alkyl group of the component (B) is an octyl group, or
(v) an average particle size of primary particles of the component (B) is 1 to 300 nm.

15. A cured product obtained by curing the curable resin composition according to claim 14.

16. An adhesive comprising:
the curable resin composition according to claim 14.

17. A sealant comprising:
the curable resin composition according to claim 14.

18. The method according to claim 12, wherein
the mass ratioofthecomponent(B):the component (C) is 8:2 to 2:8.

19. The method according to claim 13, wherein
the mass ratioofthecomponent(B):the component (C) is 8:2 to 2:8.

20. The curable resin composition according to claim 14, wherein
the mass ratioofthecomponent(B):the component (C) is 8:2 to 2:8.

* * * * *